US009493926B2

(12) United States Patent
May (10) Patent No.: US 9,493,926 B2
(45) Date of Patent: Nov. 15, 2016

(54) PIN ASSEMBLY FOR WORK IMPLEMENT COUPLING ASSEMBLY HAVING FLOAT AND LOCK POSITIONS (71) Applicant: Caterpillar Inc., Peoria, IL (US)

(72) Inventor: Michael P. May, Wamego, KS (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/611,986

(22) Filed: Feb. 2, 2015

(65) Prior Publication Data
US 2016/0222626 A1 Aug. 4, 2016

(51) Int. Cl.
| *A01B 15/20* | (2006.01) |
| *E02F 3/00* | (2006.01) |
| *E02F 3/80* | (2006.01) |
| *E02F 3/76* | (2006.01) |
| *F16C 11/10* | (2006.01) |

(52) U.S. Cl.
CPC ............... *E02F 3/80* (2013.01); *E02F 3/764* (2013.01); *F16C 11/10* (2013.01)

(58) Field of Classification Search
CPC .. A01D 34/286; A01D 41/144; A01B 3/464; A01B 15/14; A01B 73/00; A01B 15/20; E02F 3/80; E02F 3/764; F16C 11/10
USPC ............ 37/468, 403, 407; 172/4.5, 780–799, 172/177, 810–834, 775; 56/15.8, 14.9, 210
See application file for complete search history.

(56) References Cited

U.S. PATENT DOCUMENTS

| 1,961,011 | A | * | 5/1934 | Pearson | E02F 3/7627 |
| | | | | | 172/823 |
| 2,011,191 | A | * | 8/1935 | Choate | E02F 3/7613 |
| | | | | | 172/823 |
| 3,357,720 | A | | 12/1967 | Kulhavy et al. | |
| 4,105,078 | A | | 8/1978 | Gilbert | |
| 4,211,282 | A | * | 7/1980 | Frisbee | E02F 3/844 |
| | | | | | 172/7 |
| 6,109,814 | A | | 8/2000 | Cox et al. | |
| 8,336,639 | B2 | * | 12/2012 | Palen | A01B 63/22 |
| | | | | | 172/328 |
| 8,359,715 | B2 | | 1/2013 | Turner et al. | |
| 2015/0292171 | A1 | | 10/2015 | May et al. | |

FOREIGN PATENT DOCUMENTS

| DE | 2358066 | 5/1975 |
| DE | 2902512 | 7/1980 |
| WO | 2011123956 | 10/2011 |

* cited by examiner

*Primary Examiner* — John G Weiss
(74) *Attorney, Agent, or Firm* — Miller, Matthias & Hull LLP (57) ABSTRACT

A coupling assembly for a machine includes a work implement having a float mode, in which the work implement moves relative to the machine, and a lock mode, in which the work implement has a fixed position relative to the machine. A pin assembly connects the work implement to the machine and itself is movable between a float position, in which the pin assembly supports the work implement in the float mode, and a lock position, in which the pin assembly supports the work implement in a lock mode. A retainer has a float assembly configuration, in which the retainer holds the pin assembly in the float position, and a lock assembly configuration, in which the retainer holds the pin assembly in the lock position, thereby facilitating adjustment of the work implement between float and lock modes.

19 Claims, 7 Drawing Sheets

PIN ASSEMBLY FOR WORK IMPLEMENT COUPLING ASSEMBLY HAVING FLOAT AND LOCK POSITIONS

TECHNICAL FIELD

The present disclosure generally relates to coupling assemblies, and more particularly to pin assemblies used in coupling assemblies to connect work implements to machines.

BACKGROUND

Auxiliary components, such as work implements, are often attached to machines using coupling assemblies. For example, a reversible blade (which may be used for clearing snow) may be attached to the front of a motor grader using a coupling assembly. More specifically, the reversible blade may include a connecting bracket and the motor grader may have a frame that supports a mounting bracket. The connecting bracket and mounting bracket may be attached by a pin that extends through apertures formed in the brackets.

In some applications, it may be desirable for the coupling assembly to selectively support the work implement in either "float" or "locked" (also known as "no-float") configurations. When in the float configuration, the work implement is permitted a limited amount of movement, such as rotation or translation, relative to the machine. Conversely, in the locked or no-float configuration, the work implement is secured in a substantially fixed position relative to the machine. Under certain working conditions, such as when the machine traverses uneven terrain, it may be advantageous to permit the work implement to float, thereby to interact more closely with the terrain. Other working conditions, however, may dictate that the work implement be locked or otherwise restrained from floating.

Current coupling assemblies are overly difficult and cumbersome to switch between the float and locked configurations. For example, some coupling assemblies have separate float and lock brackets on the work implement. The float bracket may have a slot sized to slidably receive the pin, while the lock bracket may have an aperture sized to closely fit the pin. Substantial disassembly and reassembly is needed to switch between float and lock configurations. If the conventional coupling assembly is in the lock configuration but the float configuration is desired, the coupling assembly must be at least partially disassembled to remove the pin from the lock bracket. Next, the lock bracket must be detached from the work implement and the float bracket must be attached to the work implement. The coupling assembly must then be reassembled so that the pin is now inserted through the float bracket. In some applications, such as implements used on earth moving machines, the work implement and coupling assembly may be extremely large and heavy. This not only increases the time, effort, and cost associated with disassembling the coupling assembly, swapping brackets, and reassembling the coupling assembly, but also discourages the operator from switching between float and lock configurations even when it would be advantageous to do so.

SUMMARY OF THE DISCLOSURE

In accordance with one aspect of the disclosure, a coupling assembly is provided for a machine. The coupling assembly includes a work implement having a float mode, in which the work implement moves relative to the machine, and a lock mode, in which the work implement has a fixed position relative to the machine. The coupling assembly also includes a pin assembly connecting the work implement to the machine, the pin assembly being movable between a float position, in which the pin assembly supports the work implement in the float mode, and a lock position, in which the pin assembly supports the work implement in a lock mode. A retainer is provided having a float assembly configuration, in which the retainer holds the pin assembly in the float position, and a lock assembly configuration, in which the retainer holds the pin assembly in the lock position.

In another aspect of the disclosure that may be combined with any of these aspects, a coupling assembly is provided for a machine having a mounting bracket. The coupling assembly includes a work implement having a work implement bracket with an interior wall defining a slot positioned at a coupling point. A pin assembly includes a pin extending along a pin axis and sized for insertion through the mounting bracket and the slot, a float cam coupled to the pin and having a float cam exterior surface defining a float profile, the float profile of the float cam exterior surface being configured relative to the work implement bracket interior wall to permit movement of the float cam relative to the slot, and a lock plate coupled to the pin and having a lock plate exterior surface defining a lock profile, the lock profile of the lock plate exterior surface being configured relative to the work implement bracket interior wall to secure the lock plate in a substantially fixed position relative to the work implement bracket. A retainer has a float assembly configuration, in which the retainer holds the pin in a float position so that the float cam is positioned at the coupling point, and a lock assembly configuration, in which the retainer holds the pin in a lock position so that the lock plate is positioned at the coupling point.

In another aspect of the disclosure that may be combined with any of these aspects, a pin assembly is provided for coupling a first bracket to a second bracket, the second bracket having a second bracket interior wall defining a slot positioned at a coupling point. The pin assembly includes a pin extending along a pin axis and sized for insertion through the first bracket and the slot, a float cam coupled to the pin and having a float cam exterior surface defining a float profile, the float profile of the float cam exterior surface being configured relative to the second bracket interior wall to permit movement of the float cam relative to the slot, and a lock plate coupled to the pin and having a lock plate exterior surface defining a lock profile, the lock profile of the lock plate exterior surface being configured relative to the second bracket interior wall to secure the lock plate in a substantially fixed position relative to the second bracket. A retainer has a float assembly configuration, in which the retainer holds the pin in a float position so that the float cam is positioned at the coupling point, and a lock assembly configuration, in which the retainer holds the pin in a lock position so that the lock plate is positioned at the coupling point.

In another aspect of the disclosure that may be combined with any of these aspects, the retainer in the float assembly configuration has a first orientation relative to the pin assembly, the retainer in the lock assembly configuration has a second orientation relative to the pin assembly, and the first orientation is inverted relative to the second orientation.

In another aspect of the disclosure that may be combined with any of these aspects, the float cam is coupled to the pin at a float cam connection point, the lock plate is coupled to the pin at a lock plate connection point, the lock plate connection point being spaced from float cam connection point by an axial length along the pin axis, and the retainer includes a retainer plate having a first end configured to mechanically engage the pin, and a spacer defining an effective spacer length substantially equal to the axial length between the float cam connection point and lock plate connection point, wherein the spacer is disposed between the retainer plate and the machine in one of the float and lock assembly configurations, and the spacer is not disposed between the retainer plate and the machine in a remaining one of the float and lock assembly configurations.

In another aspect of the disclosure that may be combined with any of these aspects, the spacer is coupled to the retainer plate.

In another aspect of the disclosure that may be combined with any of these aspects, the pin defines a channel sized to receive the retainer plate first end in both the first and second orientations of the retainer.

In another aspect of the disclosure that may be combined with any of these aspects, the lock profile of the lock plate exterior surface has a lock profile shape complementary to a shape of the work implement bracket interior wall.

In another aspect of the disclosure that may be combined with any of these aspects, the float cam comprises a bearing having an inner race and an outer race rotatable relative to the inner race and defining the float cam exterior surface.

DETAILED DESCRIPTION

Figure 1:
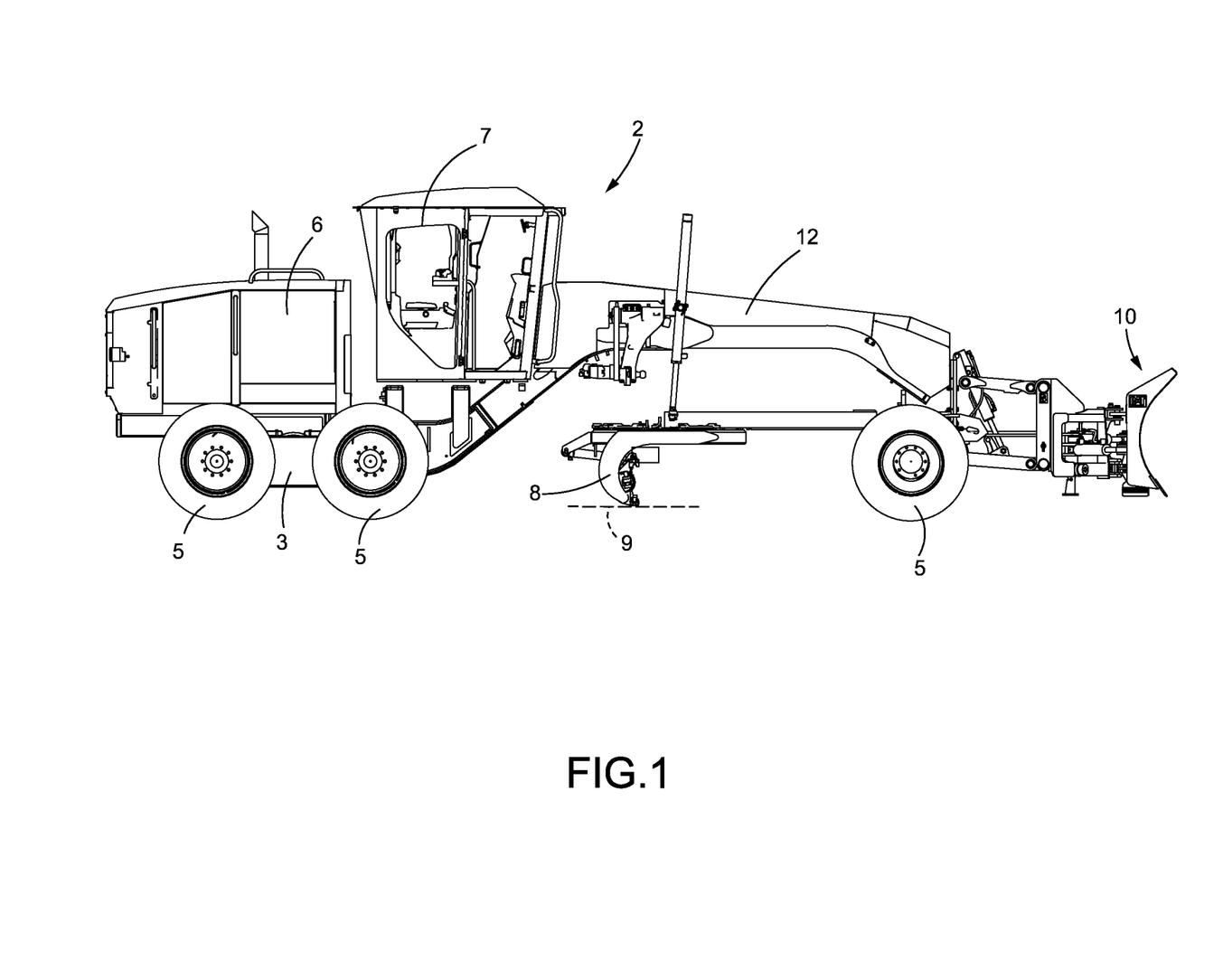
FIG. 1 is a side elevation view of a work implement, in the form of a reversible blade, coupled to a machine, in the form of a motor grader, by a coupling assembly constructed according to the present disclosure.
Figure 2:
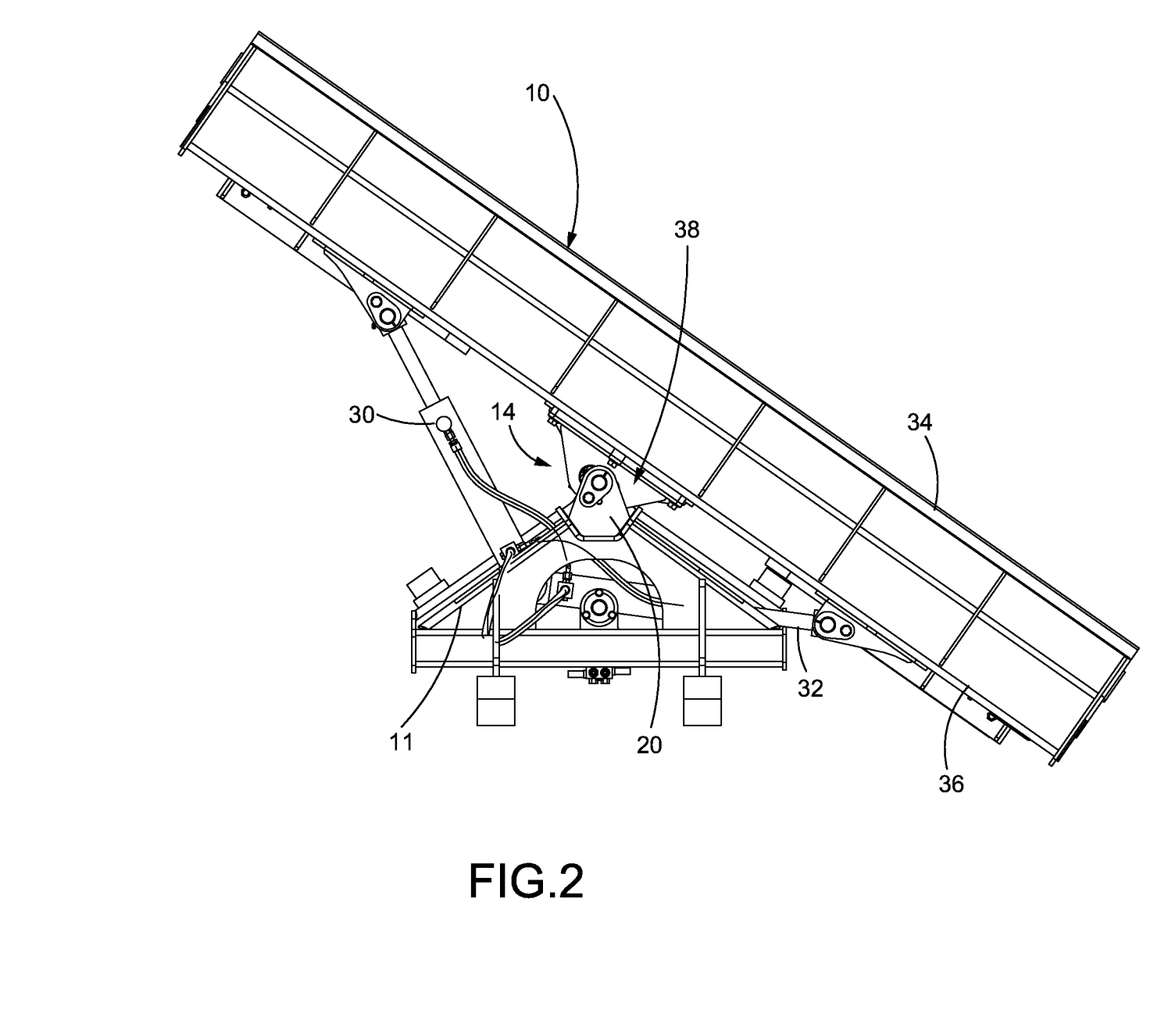
FIG. 2 is an enlarged plan view of FIG. 1 showing the coupling assembly joining the work implement to the machine.

Referring now to the drawings, and with specific reference to FIGS. 1 and 2, a work implement 10 is shown mounted on a frame 12 of a machine 2 by a coupling assembly 14 having a float configuration and a lock configuration. As understood more fully below, the coupling assembly 14 may be switched quickly and easily to support the work implement 10 in either float mode or lock mode. In "float mode," the coupling assembly 14 permits the work implement 10 to translate and/or rotate relative to the machine 2 along at least one axis, typically a lateral axis. By contrast, in "lock mode" the coupling assembly 14 secures the work implement 10 in a substantially fixed position relative to the machine 2.

The exemplary machine 2 is illustrated as a motor grader having a chassis 3 from which forwardly extends the frame 12. A forward end of the frame 12 may include an A-frame 11 and may be supported by ground engaging units, such as a pair of wheels 5. Similarly, the chassis 3 may be supported by ground engaging units, such as two pairs of wheels 5. The chassis 3 supports an engine 6 and an operator cab 7. A work blade 8 depends downwardly from the frame 12 and may be selectively operated to engage the ground 9.

While the exemplary embodiment of the machine 2 is described herein as a motor grader, the teachings of this disclosure can be employed on other earth moving or construction machines including, but not limited to, wheel loaders, back-hoes, lift-trucks, cherry-pickers, forklifts, excavators, tractors, track-type tractors, trucks, or any other movable vehicle. Similarly, while the work implement 10 is described herein as a reversible blade, the teachings of this disclose can be employed on other types of work implements such as straight blades, universal blades, blade rakes, v-plows, scarifiers, buckets, or other implements that may benefit from being able to selectively float relative to the machine to which it is coupled.

Figure 3:
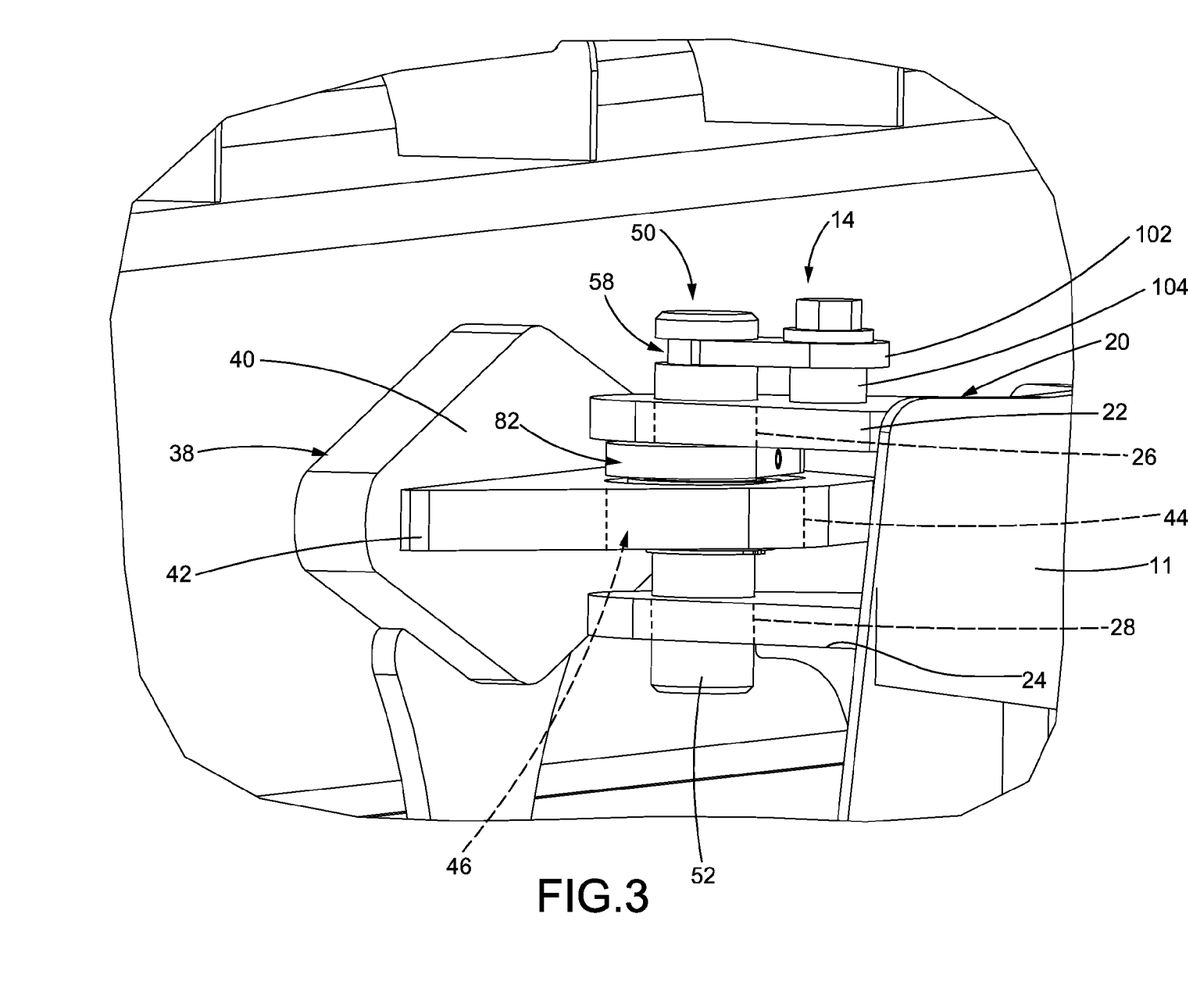
FIG. 3 is a perspective view of the coupling assembly in a float configuration.
Figure 4:
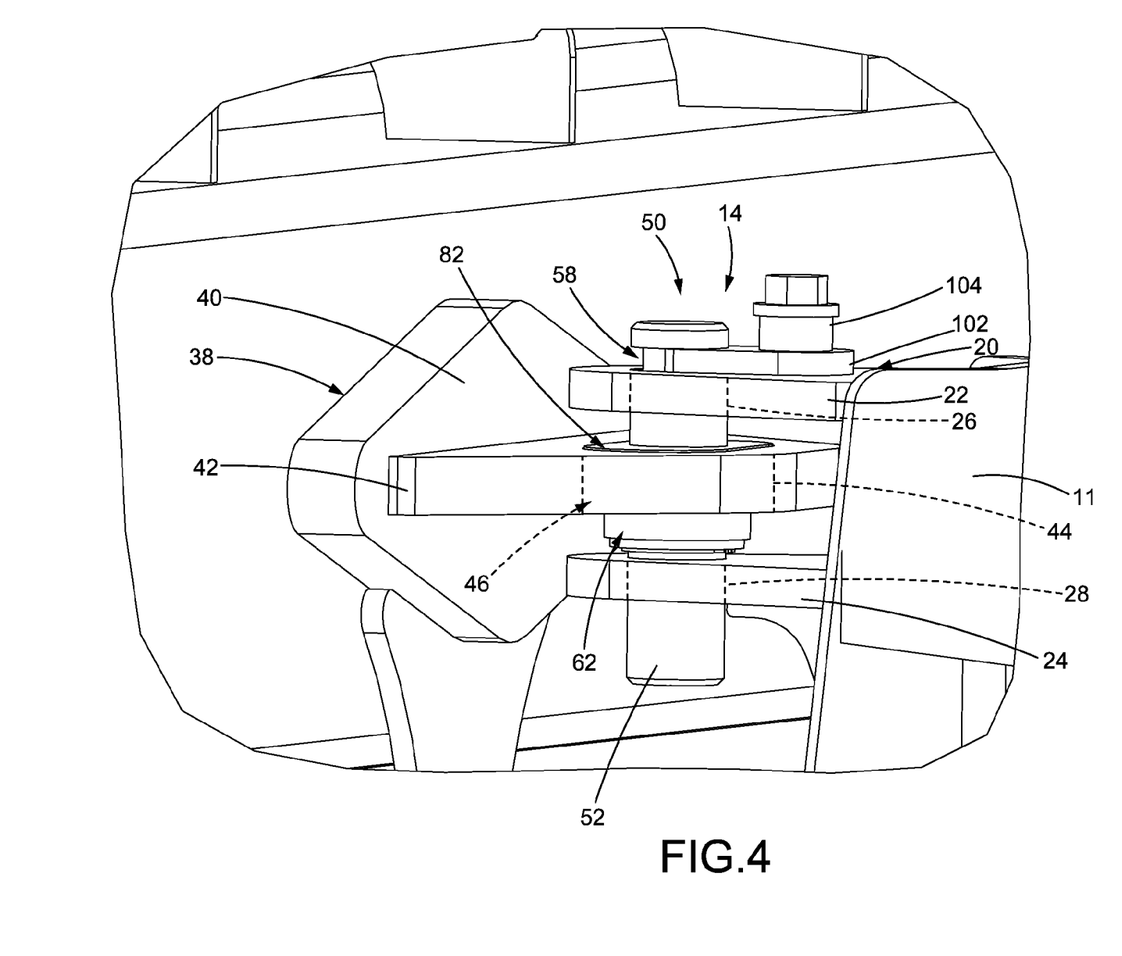
FIG. 4 is a perspective view of the coupling assembly in a lock configuration.

As best shown in FIGS. 2-4, a machine bracket 20 is coupled to the A-frame 11 and includes spaced first and second plates 22, 24. The first plate 22 defines a first aperture 26 and the second plate 24 defines a second aperture 28 aligned with the first aperture 26. Referring to FIG. 2, the machine 2 may include hydraulic actuators 30, 32 extending between the A-frame 11 and the work implement 10.

In the illustrated embodiment, the work implement 10 is shown as a reversible blade having a moldboard 34 coupled to an implement frame 36. A work implement bracket 38 is coupled to the implement frame 36 and includes a base 40 and a lug 42. The lug 42 is sized for insertion between the first and second plates 22, 24 of the machine bracket 20. Additionally, the lug 42 includes an interior wall 44 defining a slot 46. While the slot 46 is illustrated as having an obround shape, the slot 46 may be provided in other shapes without departing from the present disclosure. The work implement bracket 38 may be positioned so that the slot 46 is aligned with the first and second apertures 26, 28 to define a coupling point for the coupling assembly 14, as will be better understood below. Because the slot 46 is formed in the lug 42, the coupling point is also located between the first and second plates 22, 24 of the machine bracket 20.

Figure 5:
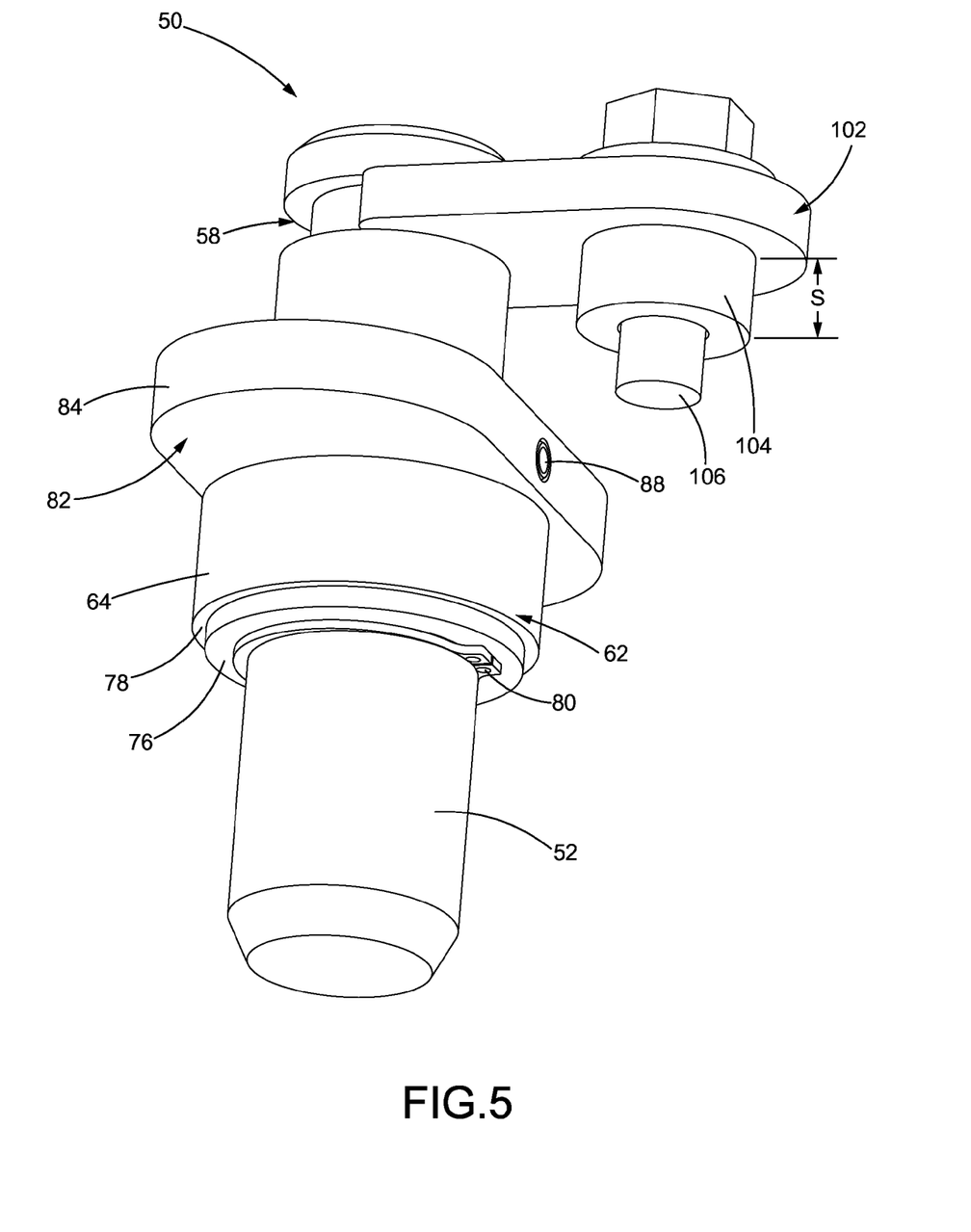
FIG. 5 is a perspective view of a pin assembly used in the coupling assembly.
Figure 6:
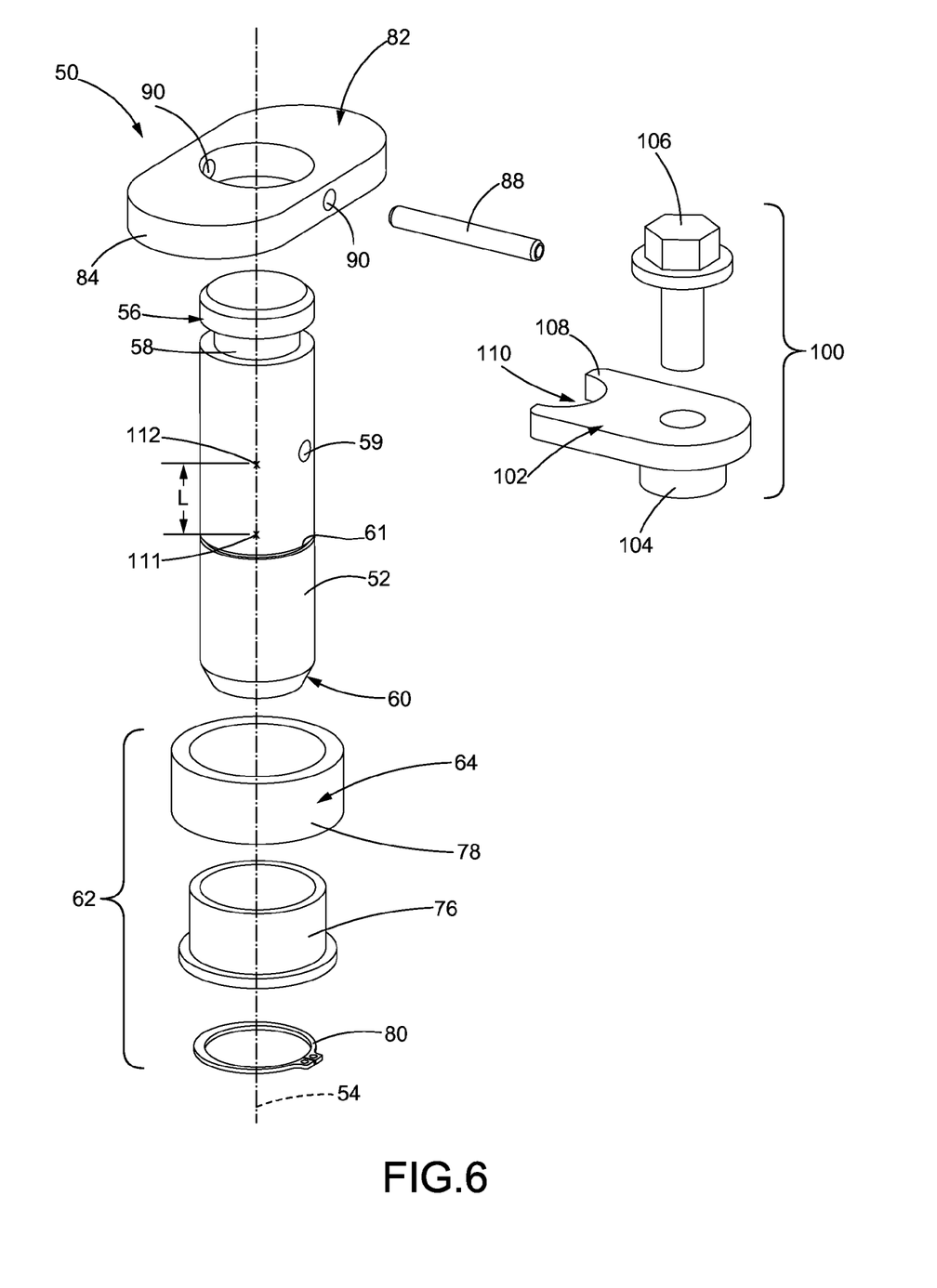
FIG. 6 is an exploded perspective view of the pin assembly of FIG. 5.

The coupling assembly 14 further includes a pin assembly 50 for mechanically coupling the machine bracket 20 to the work implement bracket 38. With reference to FIGS. 3-5, the pin assembly 50 includes a pin 52 extending along a pin axis 54 and sized for insertion through the first and second apertures 26, 28 as well as the slot 46. As best shown in FIG. 6, the pin 52 includes a first end 56 formed with a channel 58 and a second end 60 that is tapered to facilitate insertion of the pin 52 through a float cam 62 and snap ring 80 (discussed in greater detail below) located between the first and second apertures 26, 28 and the slot 46. The pin 52 further may include a through hole 59 and a seat 61.

Figure 7:
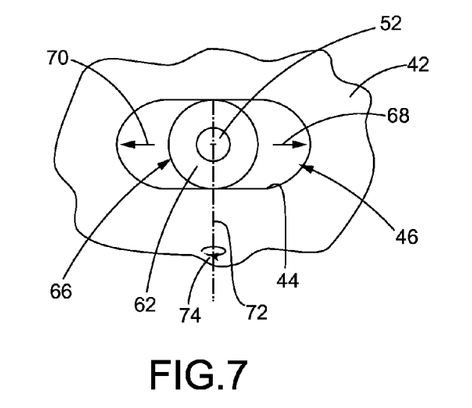
FIG. 7 is a plan view of a float cam of the coupling assembly disposed in a slot of a work implement bracket.

The pin assembly 50 further includes a float cam 62 coupled to the pin 52 that is used when the coupling assembly 14 is in the float configuration. The float cam 62 has a float cam exterior surface 64 configured to permit movement of the work implement bracket 38 relative to the pin 52. More specifically, the float cam exterior surface 64 defines a float profile 66 that is configured relative to the interior wall 44 of the work implement bracket 38 to permit movement of the float cam 62 within the slot 46. For example, as best shown in FIG. 7, the float profile 66 of the float cam exterior surface 64 may have a circular shape while the interior wall 44 of the work implement bracket 38 has an obround shape. As a result, the float cam 62 is permitted limited movement within the slot relative to the work implement bracket 38, such as translation in the direction of arrows 68, 70 and/or rotation about a reference axis 72 as indicated by arrow 74. While a circular float profile 66 and an obround-shaped interior wall 44 are shown, it will be appreciated that other shapes may be used for the float profile 66 and interior wall 44 as long as they permit movement of the float cam 62 relative to the work implement bracket 38 in at least one degree of freedom.

In the illustrated embodiment, the float cam 62 is provided as a bearing having an inner race 76 and an outer race 78 rotatable relative to the inner race 76, as best shown in FIG. 6. A snap ring 80 sized to engage the seat 61 may be used to secure the float cam 62 in the desired position on the pin 52. In some embodiments, the inner race 76 is formed of plastic while the outer race 78 is formed of steel, however other materials may be used without departing from the scope of the present disclosure. Still further, while providing the float cam 62 in the form of a bearing may facilitate movement of the work implement bracket 38 relative to the pin 52, in some applications the float cam 62 does not rotate.

When in the "float configuration," the coupling assembly 14 permits the work implement 10 to move with respect to the frame 12 of the machine 2 relative to at least one axis. In the exemplary embodiments, the pin assembly 50 enables the work implement 10 to rotate, or "oscillate" about a lower connection point, which in the case of the reversible blade depicted in FIGS. 1 and 2 is a ball and socket connection. The pin assembly 50 thus allows the work implement 10 to rotate from side-to-side relative to a horizontal axis running along the fore-aft direction of the machine 2, similar to the direction of "roll" in an aircraft. In this exemplary embodiment, therefore, the pin assembly 50 provides freedom of rotation of the work implement 10, although translation may be construed by the linear travel of the float cam 62 within the slot 46. Further, it is possible to provide two pin assemblies 50 at different positions and in different orientations, one of the pin assemblies may be configured to permit rotational float while the other of the pin assemblies may be configured to permit translational float.

Figure 8:
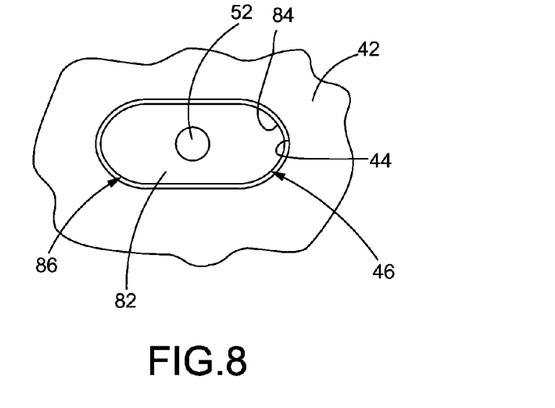
FIG. 8 is a plan view of a lock plate of the coupling assembly disposed in a slot of a work implement bracket.
Figure 9A:
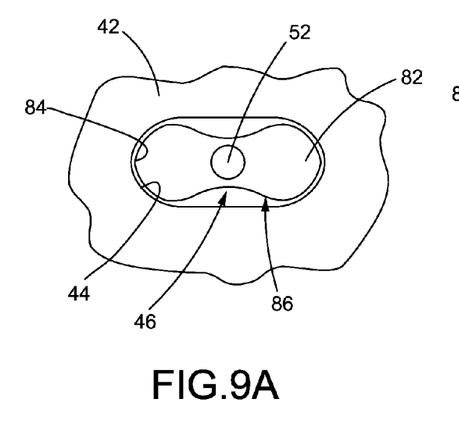
FIGS. 9A to 9D are plan views of alternative embodiments of lock plates having different lock profiles.
Figure 9B:
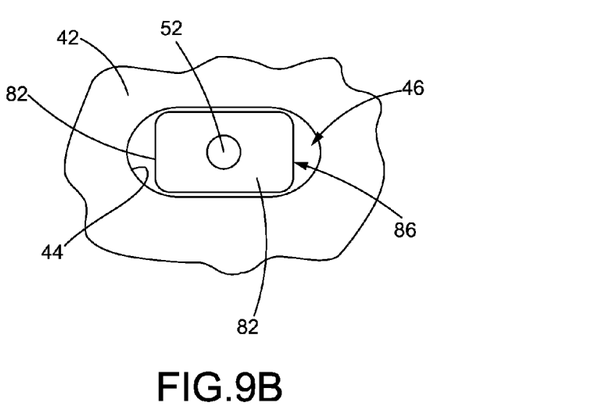
Figure 9C:
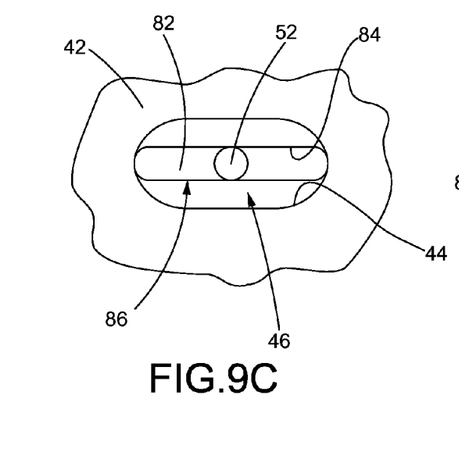
Figure 9D:
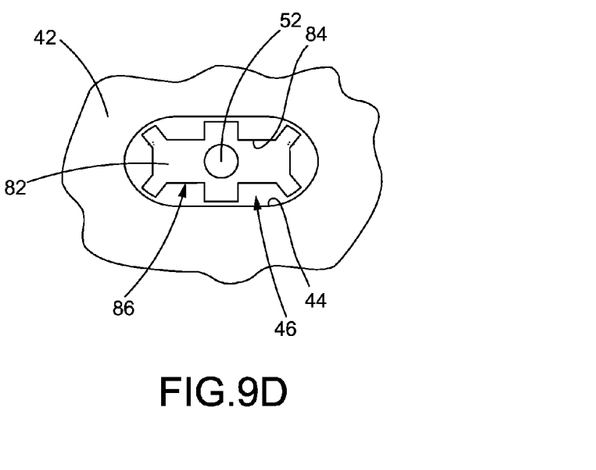

The coupling assembly 14 also includes a lock plate 82 coupled to the pin 52 that is used when the coupling assembly 14 is in the lock configuration. The lock plate 82 has a lock plate exterior surface 84 configured to prevent movement of the work implement bracket 38 relative to the pin 52. More specifically, the lock plate exterior surface 84 defines a lock profile 86 that is configured relative to the interior wall 44 of the work implement bracket 38 to prevent movement of the lock plate 82 within the slot 46, thereby to secure the pin 52 in a substantially fixed position relative to the work implement bracket 38. In some applications, the lock profile 86 of the lock plate exterior surface 84 has a lock profile shape that is complementary to a shape of the interior wall 44 of the work implement bracket, as shown in FIG. 8 where both the lock profile shape and interior wall shape are obround. It is not necessary for the lock profile shape and the interior wall shape to be complementary, however, as long as the shape of the lock profile 86 prevents movement of the lock plate 82 within the slot 46. Some examples of the lock profile 86 and interior wall 44 having non-complementary shapes are illustrated at FIGS. 9A-9D.

The lock plate 82 may be secured to the pin 52 by a retaining pin 88. More specifically, a through hole 90 extends through the lock plate 82 and the lock plate 82 may be positioned along the pin 52 so that the lock plate through hole 90 is aligned with the pin through hole 59. The retaining pin 88 then may be inserted through both through holes 59, 90 to secure the lock plate 82 in the desired position.

The coupling assembly 14 also includes a retainer 100 for holding the pin 52 in a desired position relative to the machine bracket 20 and the work implement bracket 38. In the illustrated embodiment, the retainer 100 includes a retainer plate 102, a spacer 104, and a fastener 106. The retainer plate 102 includes a connection end 108 formed with an arcuate recess 110 having a shape that may be complementary to the channel 58. The channel 58 is sized to receive a thickness of the retainer connection end 108. The retainer plate 102 also includes an aperture for receiving the fastener 106, which may extend into and threadably engage the first plate 22 of the machine bracket 20. The spacer 104 may be provided as an annular collar having an interior hole through which the fastener 106 may pass. In the illustrated embodiment, the spacer 104 is attached to the retainer plate 102, however the spacer 104 may alternatively be provided as a separate component.

The spacer 104 may be sized to facilitate switching the coupling assembly 14 between float and lock configurations. As best shown in FIGS. 5 and 6, the float cam 62 is coupled to the pin 52 at a float connection point 111, while the lock plate 82 is coupled to the pin 52 at a lock connection point 112. The lock connection point 112 is spaced from float connection point 111 by an axial length "L" (FIG. 6) along the pin axis 54. The spacer 104 may have an effective spacer length "S" that is substantially equal to the axial length "L".

INDUSTRIAL APPLICABILITY

From the foregoing, it can be seen that the technology disclosed herein has industrial applicability in a variety of settings such as, but not limited to, providing a coupling assembly between a machine and a work implement having both float and lock configurations. As will be understood from the above, switching the coupling assembly between float and lock configurations requires only that the pin 52 be adjusted to the desired position, thereby greatly simplifying this operation. Furthermore, when the spacer 104 is sized as described above and attached to the retainer plate 102, the operator need only flip over the retainer plate 102 to switch the elevation of the retainer plate 102.

More specifically, the retainer 100 may be placed in a first assembly configuration, in which the spacer 104 is disposed between the first plate 22 of the machine bracket 20 and the retainer plate 102, thereby to position the retainer plate 102 at a first elevation relative to the first plate 22. In the illustrated embodiment, when the retainer plate is at the first elevation, the retainer plate 102 will secure the pin 52 in a float position, in which the float cam 62 is positioned at the coupling point, as best shown in FIG. 3. With the pin 52 in the float position, the float cam 62 allows the work implement bracket 38 to move relative to the pin 52, thereby allowing the work implement 10 to float relative to the frame 12 of the machine 2.

Alternatively, the retainer 100 may be placed in a second assembly configuration, in which the spacer is not disposed between the first plate 22 of the machine bracket 20 and the retainer plate 102, thereby to position the retainer plate at a second elevation relative to the first plate 22. In the illustrated embodiment, when the retainer plate 102 is positioned at the second elevation, the retainer plate will secure the pin 52 in a lock position, in which the lock plate 82 is positioned at the coupling point, as best shown in FIG. 4. With the pin 52 in the lock position, the lock plate 82 prevents relative movement between the pin 52 and work implement bracket 38, thereby to fix a position of the work implement 10 relative to the frame 12 of the machine 2 and prevent float.

When the spacer 104 is attached to the retainer plate 102, the retainer 100 may be quickly and easily switched between the first and second assembly configurations. More specifically, the retainer 100 may be placed in the first assembly configuration by placing the retainer plate in a first orientation, in which the spacer 104 faces toward the first plate 22 of the machine bracket 20. Additionally, the retainer 100 may be placed in the second assembly configuration by placing the retainer plate in a second orientation, in which the spacer 104 faces away from the first plate 22 of the machine bracket 20. In this embodiment, switching the retainer 100 between first and second orientations (and, therefore, switching the coupling assembly between float and lock configurations) requires the operator to simply remove the fastener 106, flip over the retainer plate 102 from the first to the second orientation (or vice versa), and reattach the fastener 106.

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. Moreover, all methods described herein can be performed in any suitable order unless otherwise indicated herein or otherwise clearly contradicted by context.

What is claimed is:

1. A coupling assembly for a machine, the coupling assembly comprising:
   a work implement having a float mode, in which the work implement moves relative to the machine, and a lock mode, in which the work implement has a fixed position relative to the machine;
   a pin assembly connecting the work implement to the machine, the pin assembly being movable between a float position, in which the pin assembly supports the work implement in the float mode, and a lock position, in which the pin assembly supports the work implement in a lock mode; and
   a retainer having a float assembly configuration, in which the retainer holds the pin assembly in the float position, and a lock assembly configuration, in which the retainer holds the pin assembly in the lock position in which:
   the retainer in the float assembly configuration has a first orientation relative to the pin assembly;
   the retainer in the lock assembly configuration has a second orientation relative to the pin assembly; and
   the first orientation is inverted relative to the second orientation.

2. The coupling assembly of claim 1, in which:
   the work implement includes a work implement bracket having an interior wall defining a slot positioned at a coupling point; and
   the pin assembly includes:
      a pin sized for insertion through the slot and extending along a pin axis;
      a float cam coupled to the pin and having a float cam exterior surface defining a float profile, the float profile of the float cam exterior surface being configured relative to the work implement bracket interior wall to permit movement of the float cam relative to the slot; and
      a lock plate coupled to the pin and having a lock plate exterior surface defining a lock profile, the lock profile of the lock plate exterior surface being configured relative to the work implement bracket interior wall to secure the lock plate in a substantially fixed position relative to the work implement bracket.

3. The coupling assembly of claim 2, in which:
   the float cam is coupled to the pin at a float cam connection point;
   the lock plate is coupled to the pin at a lock plate connection point, the lock plate connection point being spaced from float cam connection point by an axial length along the pin axis; and
   the retainer includes:
      a retainer plate having a first end configured to mechanically engage the pin; and
      a spacer defining an effective spacer length substantially equal to the axial length between the float cam connection point and lock plate connection point;
      wherein the spacer is disposed between the retainer plate and the machine in one of the float and lock assembly configurations, and the spacer is not disposed between the retainer plate and the machine in a remaining one of the float and lock assembly configurations.

4. The coupling assembly of claim 3, in which the spacer is coupled to the retainer plate.

5. The coupling assembly of claim 3, in which the pin defines a channel sized to receive the retainer plate first end in both the first and second orientations of the retainer.

6. The coupling assembly of claim 2, in which the lock profile of the lock plate exterior surface has a lock profile shape complementary to a shape of the work implement bracket interior wall.

7. The coupling assembly of claim 2, in which the float cam comprises a bearing having an inner race and an outer race rotatable relative to the inner race and defining the float cam exterior surface.

8. A coupling assembly for a machine having a mounting bracket, the coupling assembly comprising:
   a work implement including a work implement bracket having an interior wall defining a slot positioned at a coupling point; and
   a pin assembly including:
   a pin extending along a pin axis and sized for insertion through the mounting bracket and the slot;
   a float cam coupled to the pin and having a float cam exterior surface defining a float profile, the float profile of the float cam exterior surface being configured relative to the work implement bracket interior wall to permit movement of the float cam relative to the slot;
   a lock plate coupled to the pin and having a lock plate exterior surface defining a lock profile, the lock profile of the lock plate exterior surface being configured relative to the work implement bracket interior wall to secure the lock plate in a substantially fixed position relative to the work implement bracket; and
   a retainer having a float assembly configuration, in which the retainer holds the pin in a float position so that the float cam is positioned at the coupling point, and a lock assembly configuration, in which the retainer holds the pin in a lock position so that the lock plate is positioned at the coupling point.

9. The coupling assembly of claim 8, in which:
the float cam is coupled to the pin at a float cam connection point;
the lock plate is coupled to the pin at a lock plate connection point, the lock plate connection point being spaced from float cam connection point by an axial length along the pin axis; and
the retainer includes:
   a retainer plate having a first end configured to mechanically engage the pin; and
   a spacer defining an effective spacer length substantially equal to the axial length between the first and second axial points;
   wherein the spacer is disposed between the retainer plate and the machine in one of the float and lock assembly configurations, and the spacer is not disposed between the retainer plate and the machine in a remaining one of the float and lock assembly configurations.

10. The coupling assembly of claim 9, in which:
the spacer is coupled to the retainer plate,
the retainer in the float assembly configuration has a first orientation relative to the pin assembly;
the retainer in the lock assembly configuration has a second orientation relative to the pin assembly; and
the first orientation is inverted relative to the second orientation.

11. The coupling assembly of claim 10, in which:
the mounting bracket includes a first plate defining a first aperture and a second plate defining a second aperture;
the float assembly configuration of the retainer comprises positioning the retainer plate at a first elevation relative to the first plate of the mounting bracket; and
the lock assembly configuration of the retainer comprises positioning the retainer plate at a second elevation relative to the first plate of the mounting bracket.

12. The coupling assembly of claim 8, in which the lock profile of the lock plate exterior surface has a lock profile shape complementary to a shape of the work implement bracket interior wall.

13. The coupling assembly of claim 8, in which the float cam comprises a bearing having an inner race and an outer race rotatable relative to the inner race and defining the float cam exterior surface.

14. The coupling assembly of claim 8, in which the work implement comprises a reversible blade.

15. A pin assembly for coupling a first bracket to a second bracket, the second bracket having a second bracket interior wall defining a slot positioned at a coupling point, the pin assembly comprising:
   a pin extending along a pin axis and sized for insertion through the first bracket and the slot;
   a float cam coupled to the pin and having a float cam exterior surface defining a float profile, the float profile of the float cam exterior surface being configured relative to the second bracket interior wall to permit movement of the float cam relative to the slot;
   a lock plate coupled to the pin and having a lock plate exterior surface defining a lock profile, the lock profile of the lock plate exterior surface being configured relative to the second bracket interior wall to secure the lock plate in a substantially fixed position relative to the second bracket; and
   a retainer having a float assembly configuration, in which the retainer holds the pin in a float position so that the float cam is positioned at the coupling point, and a lock assembly configuration, in which the retainer holds the pin in a lock position so that the lock plate is positioned at the coupling point.

16. The pin assembly of claim 15, in which:
the float cam is coupled to the pin at a float cam connection point;
the lock plate is coupled to the pin at a lock plate connection point, the lock plate connection point being spaced from float cam connection point by an axial length along the pin axis; and
the retainer includes:
   a retainer plate having a first end configured to mechanically engage the pin; and
   a spacer defining an effective spacer length substantially equal to the axial length between the first and second axial points;
   wherein the spacer is disposed between the retainer plate and the first bracket in one of the float and lock assembly configurations, and the spacer is not disposed between the retainer plate and the first bracket in a remaining one of the float and lock assembly configurations.

17. The pin assembly of claim 16, in which:
the spacer is coupled to the retainer plate,
the retainer in the float assembly configuration has a first orientation relative to the pin assembly;
the retainer in the lock assembly configuration has a second orientation relative to the pin assembly; and
the first orientation is inverted relative to the second orientation.

18. The pin assembly of claim 15, in which the lock profile of the lock plate exterior surface has a lock profile shape complementary to a shape of the second bracket interior wall.

19. The pin assembly of claim 15, in which the float cam comprises a bearing having an inner race and an outer race rotatable relative to the inner race and defining the float cam exterior surface.

* * * * *